June 29, 1965

C. L. HOWLETT 3,191,998

DUAL CARGO SHIP

Filed April 29, 1963

INVENTOR.
CHARLES L. HOWLETT
BY
ATTORNEYS

June 29, 1965  C. L. HOWLETT  3,191,998
DUAL CARGO SHIP
Filed April 29, 1963  9 Sheets-Sheet 2

INVENTOR.
CHARLES L. HOWLETT
BY
ATTORNEYS

FIG. 3

INVENTOR.
CHARLES L. HOWLETT
BY
ATTORNEYS

June 29, 1965

C. L. HOWLETT 3,191,998

DUAL CARGO SHIP

Filed April 29, 1963

INVENTOR.
CHARLES L. HOWLETT
BY
ATTORNEYS

FIG. 8

INVENTOR.
CHARLES L. HOWLETT
BY
ATTORNEYS

June 29, 1965

C. L. HOWLETT

3,191,998

DUAL CARGO SHIP

Filed April 29, 1963

INVENTOR.
CHARLES L. HOWLETT
BY
ATTORNEYS

June 29, 1965  C. L. HOWLETT  3,191,998
DUAL CARGO SHIP

Filed April 29, 1963  9 Sheets-Sheet 9

INVENTOR.
CHARLES L. HOWLETT
BY
ATTORNEYS

United States Patent Office 3,191,998
Patented June 29, 1965

3,191,998
DUAL CARGO SHIP
Charles L. Howlett, Alpena, Mich., assignor to Huron
Portland Cement Company
Filed Apr. 29, 1963, Ser. No. 276,338
24 Claims. (Cl. 302—52)

This invention relates to a dual cargo vehicle, that is, a vehicle which selectively may be converted for the shipment and discharge of different types of material, and particularly to a ship which selectively may be converted for the transport and discharge of pulverulent materials, such as cement, and material in lump or bulk form such as coal or ore.

At the present time, ships generally are not constructed for the transport of material having widely different characteristics. Thus, in the transport of cement, a ship particularly constructed for the transport and discharge of such material is used. In like manner, for the transport of coal or ore, a ship differently constructed and having different means for unloading the cargo is used. The result is that if a cement-carrying ship is loaded with cement at port A and discharges its cargo at port B, for example, it is not adapted to take on a load and transport back to its home port a cargo of an entirely different type, such as coal, and must deadhead back to its home port. In a similar manner, a ship which is constructed for the transport and discharge of coal, for example, which takes on a load at port B and discharges it at port A is not adapted to take on a cargo of cement for transport to port B.

In ships for the transport of pulverulent material, it is conventional to discharge the material from the lower ends of the hopper into a screw conveyor system extending fore and aft of the ship and which discharges into a suitable pneumatic conveying system from which it is discharged from the ship. On the other hand, coal-carrying ships normally are provided with belt conveyors extending fore and aft of the ship onto which the coal from the holds or bunkers is discharged and which convey the coal to a hopper adjacent one end of the ship from which the coal is discharged into an elevator and thence onto a boom which discharges the cargo on the dock.

In accordance with the present invention, the ship or other vehicle is provided with two different types of unloading mechanism, one a screw conveyor-pneumatic discharge system adapted for the unloading of pulverulent material, and the other a belt conveying system adapted for the unloading of material in lump form, and means are provided whereby either type of unloading mechanism may be used, depending upon the nature of the cargo to be discharged from the vessel. Thus, when a ship carrying a cargo of cement from port A is unloaded at port B, it may be converted to one for carrying coal, for example, and take on a load of coal for transport back to its home port. In this manner, maximum use is made of the ship since there is little or no deadheading.

More specifically, the present invention contemplates a ship having a plurality of holds or bunkers in which either a pulverulent material such as cement or a material in lump or bulk form such as coal may be loaded. Each of the bunkers has hoppers at its bottom, the side walls of which converge towards a discharge opening, and means are provided whereby the material discharged from the hoppers may be diverted either to a screw conveyor-pneumatic discharge system or to a belt conveyor discharge system for discharging lump material from the ship. To that end, a belt conveyor extends fore and aft of the ship directly beneath the discharge outlets of each longitudinal row of hoppers for the discharge of material such as coal, and a screw conveyor extends fore and aft of the ship at one side, athwartwise, of the discharge outlets of each row of hoppers.

For the unloading of material such as coal, a pair of rails extends fore and aft of the ship beneath each row of holds or bunkers extending fore and aft of the ship at each side of its longitudinal center line on which trucks carrying gates for closing the discharge openings of the hoppers are mounted and which may be brought under the hoppers to close the discharge openings during transport and until such time as it is desired to discharge the cargo. The gates are provided with lips which normally assist in closing the discharge outlets of the hoppers, but, when the holds or bunkers are to be unloaded, are dropped to an inclined position to function as chutes to feed the coal onto the belt conveyor.

For the purpose of enabling the ship to be converted to one for the transport and discharge of pulverulent material, fluid-activated gravity conveyors having gas-permeable decks through which air from underlying plenum chambers is adapted to be passed to fluidize overlying pulverulent material, are provided and are so mounted as to be brought beneath the discharge outlets of the hoppers to close them during transport and until such time as it is desired to discharge the cargo of pulverulent material. When it is desired to unload the pulverulent material from the hopper of one of the holds or bunkers, air is introduced into plenum chambers of the fluid-activated gravity conveyor closing that particular hopper and passes upwardly through the gas-permeable decks and fluidizes the overlying pulverulent material. The fluidized material flows along the gas-permeable deck to a discharge end thereof from which it is discharged into a chute leading to the screw conveyor extending fore and aft of the ship at the side of that hopper for discharge.

The invention will be further described in connection with the accompanying drawings which disclose the preferred form of the invention embodied in a ship.

Figure 1:
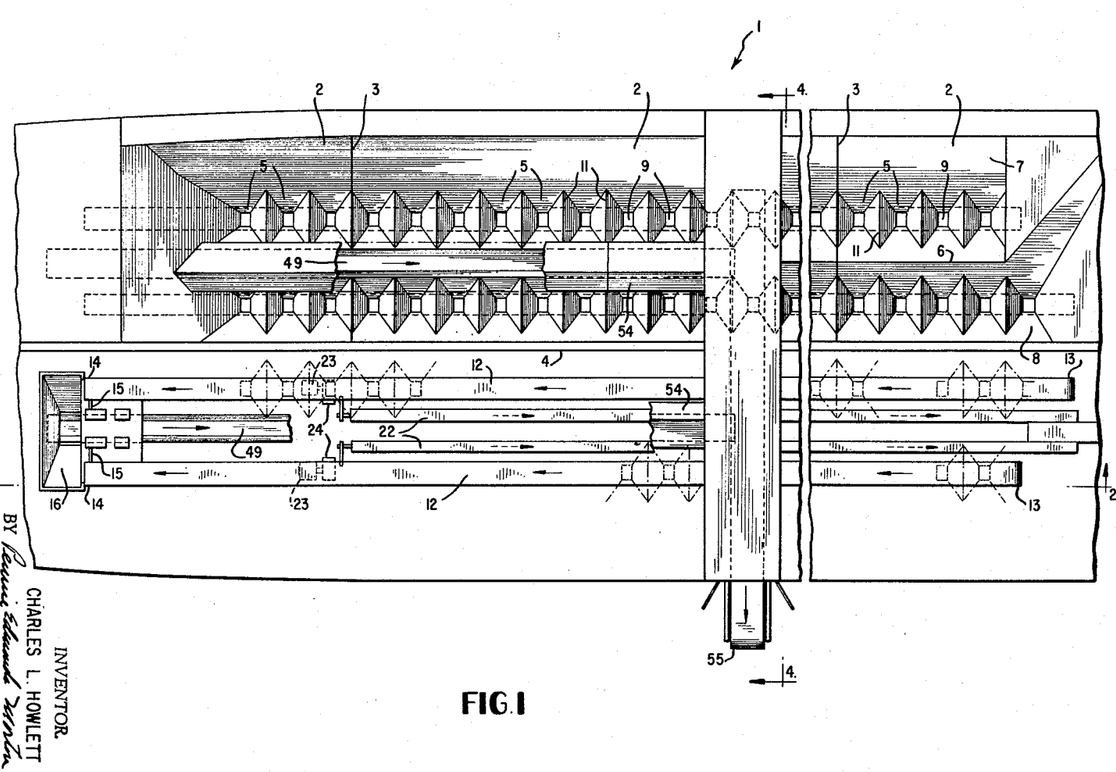
FIG. 1 is a plan view of a portion of a ship embodying the invention, with the central portion broken away, with the upper deck removed to show the manner in which the holds or bunkers for carrying the cargo are positioned, and with the holds at one side merely shown in broken lines to more clearly disclose the position of the screw conveyors and the belt conveyors relative to the hoppers.
Figure 2:
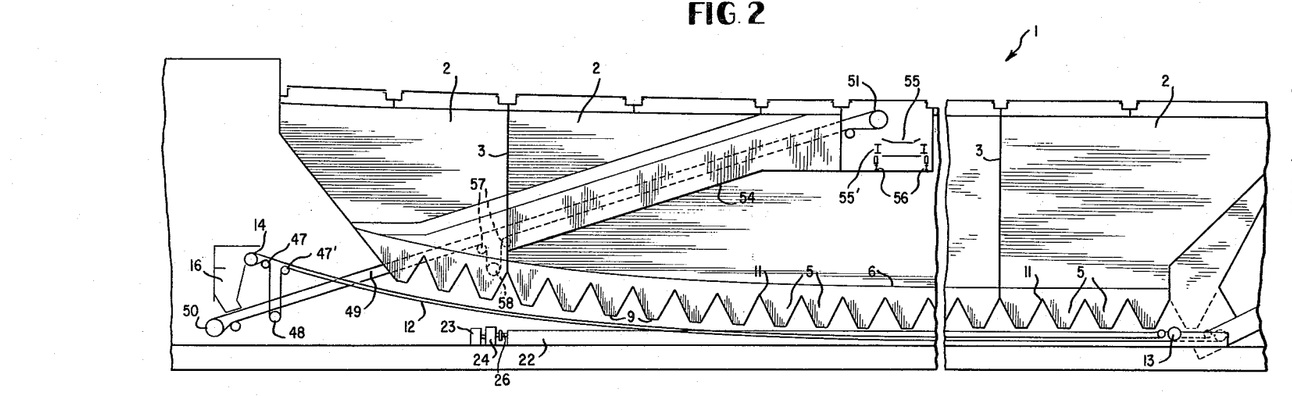
FIG. 2 is a vertical sectional view taken on line 2—2 of FIG. 1.
Figure 3:
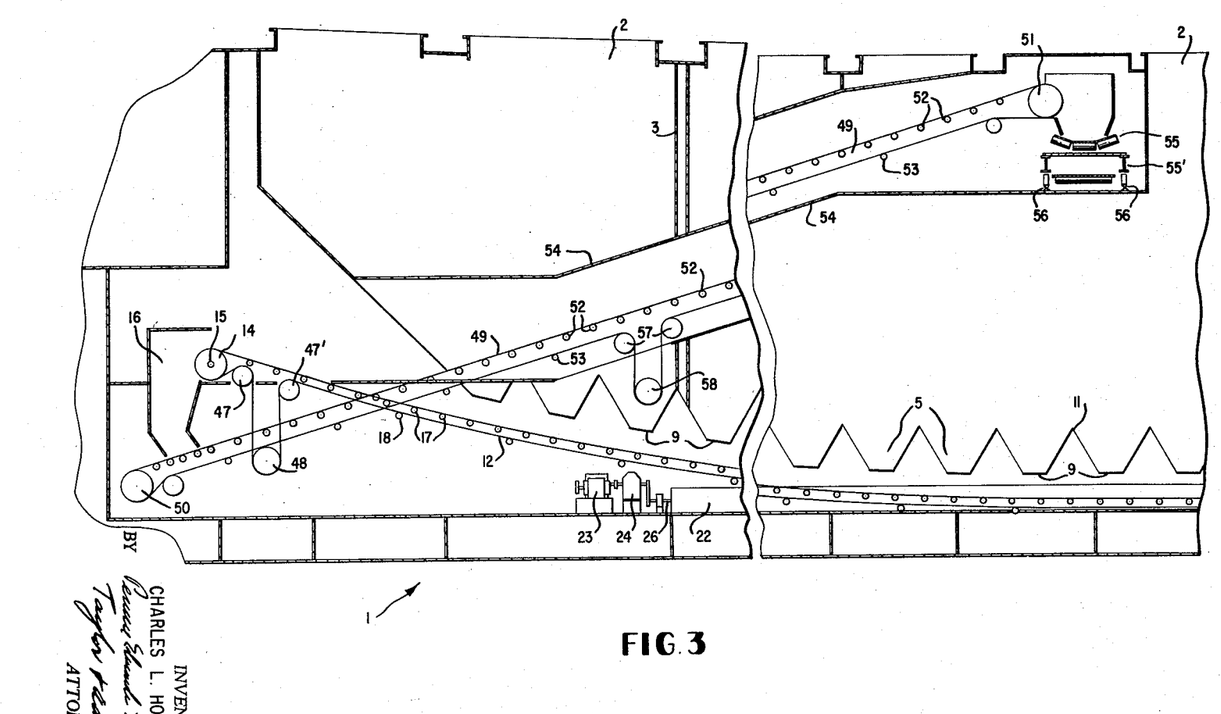
FIG. 3 is a schematic view showing the arrangement of the belt conveyors near one end of the ship.
Figure 4:
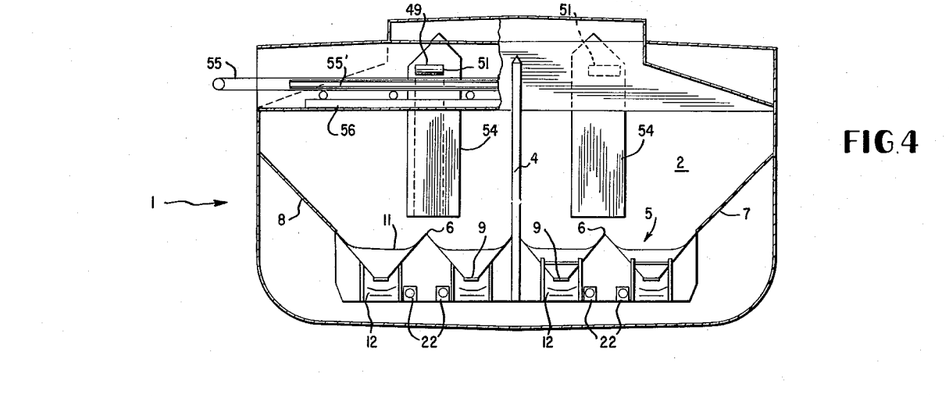
FIG. 4 is a transverse sectional view, on an enlarged scale, taken on line 4—4 of FIG. 1.

Referring to FIGS. 1 and 2, it will be noted that the vessel 1 is provided with a series of holds or bunkers 2 extending in rows fore and aft of the ship at each side of its longitudinal center. The respective bunkers or holds are separated fore and aft by athwartship bulkheads 3, and athwartwise by a centerline bulkhead 4 extending along the longitudinal center of the ship. The lower portion of each of the holds or bunkers is provided with a series of hoppers 5 formed by a central, fore and aft extending hog ridge 6 and inclined side walls 7 and 8 which, like the walls forming the hog ridge 6, diverge upwardly and outwardly from a discharge outlet 9 at the bottom of each hopper. The lower portion of each hold or bunker also is provided with transversely-extending hog ridges 11 extending between the walls 7 and 8 which diverge upwardly and outwardly from the discharge outlets 9, thereby providing at the bottom of each hold or bunker a plurality of hoppers extending both athwartwise and fore and aft of the ship.

For the unloading of lump or bulk material such as coal or iron ore, the ship is provided with a belt conveyor 12 extending fore and aft of the ship directly beneath the discharge outlets of the respective rows of hoppers. The belt conveyors 12 extend horizontally parallel to the keel of the ship throughout the midportion of the ship. At its bow end, the belt conveyors pass around pulleys 13 and at the aft end pass around pulleys 14. The pulleys 14 may be driven through power applied by shafts 15. The pulleys 14 at each side of the longitudinal center of the ship are positioned a substantially greater distance above the keel than are the pulleys 13 in order that coal discharged from belt conveyors as they pass over the pulleys 14 may be discharged into a hopper 16. This necessitates that the discharge outlets 9 of the hoppers of the holds or bunkers nearest the discharge end of the belt conveyors shall progressively be positioned at greater distances above the keel, as shown in FIG. 2. A single hopper 16 extending athwartwise of the ship at the end of the hold will be sufficient to receive material from each of the belt conveyors at each side of the longitudinal center of the ship.

The upper stretch of the belt conveyors 12 are supported by a plurality of idlers 17 spaced fore and aft of the ship. In a like manner, the lower stretch of the belt is supported by idlers 18. The idlers 18 extend the full width of each belt conveyor beneath its lower stretch to support it. The upper stretch of each belt conveyor is supported by a plurality of rollers at each athwartwise position. These rollers comprise a central roller 19 which extends horizontally beneath the central portion of each belt and two side rollers 20 and 21 which are inclined upwardly and outwardly from the ends of the central roller 19 in order to impart a trough shape to the upper flight of the belt, in order better to retain material dumped onto it for conveyance.

Figure 13:
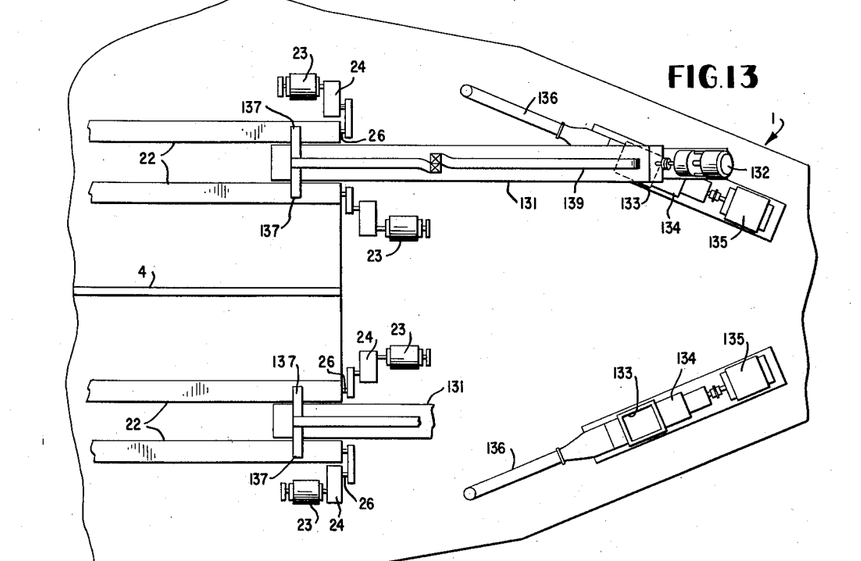
FIG. 13 is a plan view of a portion of the mechanism shown in FIG. 12.

Belt conveyors are not satisfactory for the conveyance of pulverulent material such as cement and the like. Such materials can more effectively be conveyed by a screw conveyor. For that reason, the ship also is provided with fore and aft extending screw conveyors 22 positioned between the belt conveyors 12 at each side of the center partition 4. The screw conveyors 22 are driven by motors 23 (FIG. 13) and power-transmitting means 24 extending from the motor drive shaft to the end of the shafts 26 on which the screws of the screw conveyor are mounted. A screw conveyor 22 is provided for each row of the hoppers extending fore and aft of the ship, and are located to one side of the discharge outlets 9, athwartwise of the ship.

In addition to the belt conveyors 12 and the screw conveyors 22, each discharge mechanism includes means for transferring the material from the hopper outlets to the belt conveyors, or to the screw conveyors, depending upon the type of material which is to be unloaded.

The additional means for transferring material in lump form from the hopper outlets to the belt conveyors comprises a pair of rails 27 extending fore and aft of the ship under each row of hoppers. Trucks 28 are mounted for travel along the rails and each includes a horizontally-extending gate member 29 which is adapted, when material in lump form is being transported and unloaded, to be brought to a position either directly beneath the discharge openings of the respective hoppers to prevent discharge of the material from the hoppers, or to a position such as to permit flow of material from the hoppers onto the underlying belt conveyors 12. Each gate member includes a flat horizontal upper surface 31 which is movable to a position closely adjacent the lower edge of a discharge hopper and a gate lip 32 which is pivoted at 33 to one end of the gate member and, with the upper surface 31, forms a closure for the discharge outlet of the hopper. A lever 34 is fixedly connected to the pivot pin 33. A chain 37 is connected at one end to the distal end of the lever 34. The other end of the chain is anchored to a fixed portion 36 of the ship. The chain limits the downward swing of the gate lip on opening, and closes the gate lip when the main gate member 29 is closed.

Each truck 28 has an upwardly-extending bracket 38 which is connected by a piston rod 39 to an air cylinder 40 which is anchored at 41 to a fixed portion of the vessel. The air cylinder 40 is connected to a suitable source of air under pressure and suitable means, to be described later, are provided for controlling the supply of air to the cylinder. When air in sufficient amount is supplied to the end of the cylinder adjacent its fixed end, the piston rod 39 is moved outwardly to its maximum distance to move the truck 28, upper surface 31 of gate member 29 and the gate lip 32 to the position shown at the right side of FIG. 7 in which they no longer lie beneath the discharge outlet of the hopper. In this position, the gate lip is supported and held against further downward swinging movement by tension applied by chain 37. Also, when the gate unit and gate lip are in this position a fluid-activated gravity conveyor 60, shown in broken lines, may be inserted beneath the hopper for the discharge of pulverulent material. Since the pivot pin 33 is carried by the truck 28, movement of the truck in a direction away from the air cylinder will permit the movement of the pivot pin in the same direction and result in the lever 34 swinging in a clockwise direction with concomitant swinging of the gate lip 32 in the same direction. Thus, by introducing only sufficient air into air cylinder 40 to extend the piston 39 only a portion of its full stroke, the gate lip initially may be dropped only to the inclined position 42, shown in broken lines in FIG. 7, to act as a chute to feed coal from the hoppers onto the belt conveyor and later to the full-line position where it provides room for the insertion of the fluid-activated conveyor 60 under the discharge hopper 9.

The gate lip 32 is provided with side flanges 43 to prevent material from flowing over the side edges of the lip; and to prevent flow of material over the side edges of the belt conveyor, skirt boards 44 (FIGS. 5 and 6), whose lower edges extend over the outer side edges of the belt, are provided.

To maintain proper tension upon the belt conveyor 12, the lower stretch passes about rollers 47 and 47' and a tension roller 48 which is urged downwardly and maintains the desired degree of tension on the belt.

The coal which is discharged from the belt conveyors 12 into the hopper 16 is discharged from the lower end of the hopper onto a belt 49 which passes around pulleys 50 and 51. Pulley 51 is power driven. The upper and lower stretches of the conveyor belt 49 are supported by idlers 52 and 53 similar to the idlers 17 and 18, respectively, which support the belt conveyor 12. The idlers 52 for the upper stretch of the belt comprise a central idler and inclined side idlers, like the idlers 19, 20 and 21, which impart a trough shape to the upper flight of the belt.

The belt 49 extends upwardly through a tunnel 54 which passes through the holds or bunkers on each side of the vessel closest the discharge end of the hold belt conveyor 12. The material discharged from the upper flight of the belt 49, as it passes over the pulley 51, falls onto an athwartship conveyor 55 of conventional construction which is mounted on truck 55' movable on rails 56 extending athwartwise of the ship. Alternately, the material could pass over pulley 51 and fall into a common hopper and discharge onto a conventional boom conveyor pivoted to discharge either to port or starboard. The conveyor 55 is driven by a reversible motor and is adapted to be projected through port holes in either the starboard or port side of the vessel, depending upon which side of the vessel it is desired to discharge the coal into receiving hoppers on the dock.

Tensioning means in the form of rollers 57 and a tension roller 58, similar to the rollers 47 and tension roller 48, are provided for maintaining the desired tension on the belts 49.

If desired, or if found necessary, the hopper 16 may be provided with conveyor means for transferring coal from the starboard side to the port side for discharge onto the belt conveyor 49; or separate hoppers 16 may be located at both the starborad and port sides of the ship and separate conveyor belt systems provided for conveying the coal from each hopper 16 to the receiving hopper on the dock.

Figure 5:
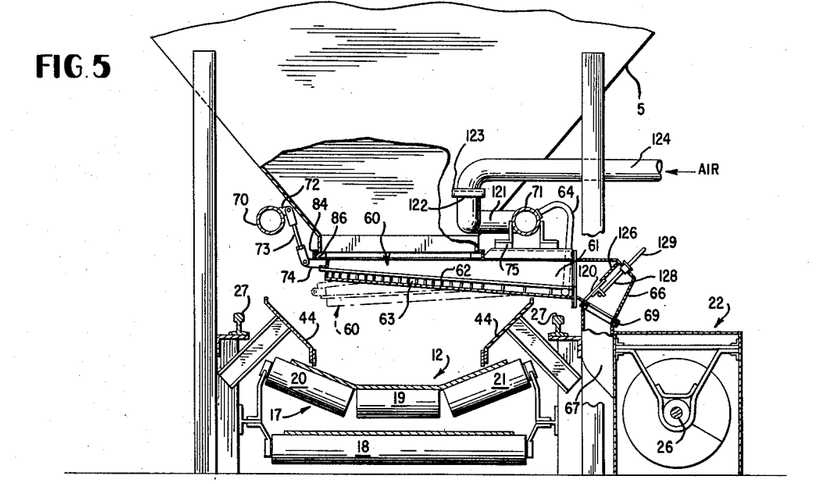
FIG. 5 is a transverse sectional view, on an enlarged scale, illustrating the relative position of the belt conveyor and the screw conveyor relative to one of the hopper outlets, and showing a fluid-activated gravity conveyor positioned beneath the hopper outlet for the discharge of pulverulent material.
Figure 6:
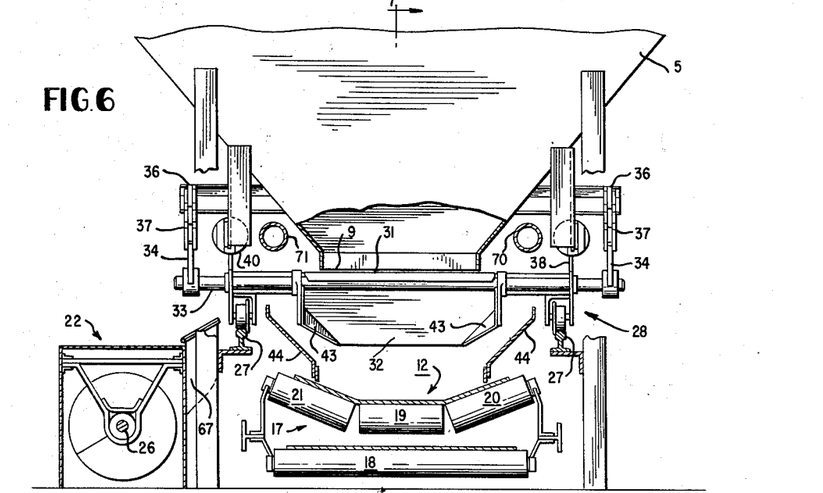
FIG. 6 is a view generally similar to FIG. 5 but with one of the gates which are used to close the hopper discharge outlets when coal is being transported positioned beneath the hopper outlet.
Figure 7:
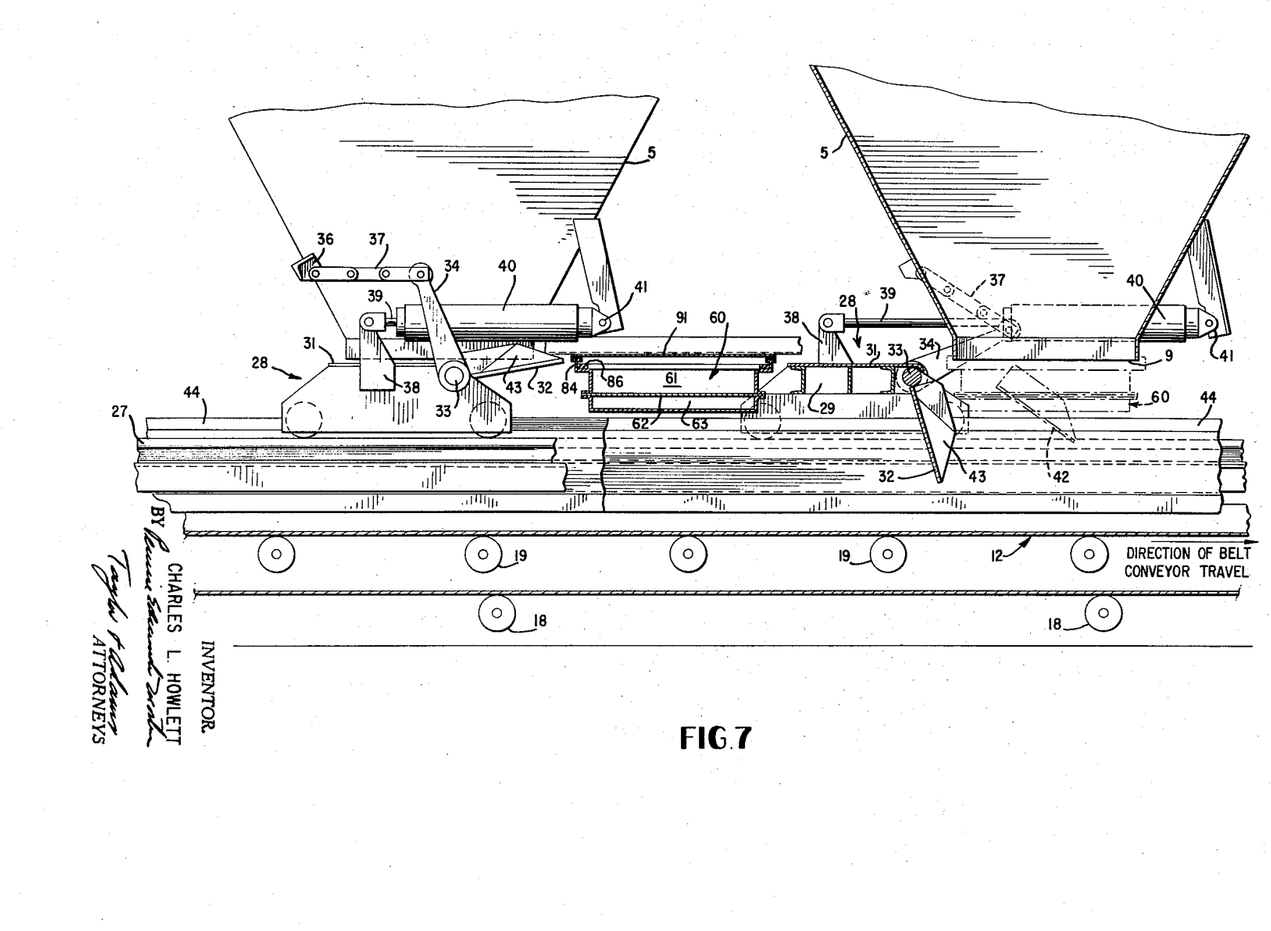
FIG. 7 is a sectional view taken on line 7—7 of FIG. 6 at right angles to FIGS. 5 and 6 and showing closure gate and gate lip positioned beneath one hopper in position to close that hopper and the relative position of the gate of an adjacent hopper when it has been shifted to permit the placing of a fluid-activated gravity conveyor beneath the discharge outlet of the hopper.

If the material to be discharged from a particular hopper or hoppers is of a pulverulent character, such as cement, the trucks 28, gate units 29 and gate lips 32 for those hoppers are moved to their extreme position from beneath the discharge outlets 9 of the hoppers, as shown at the right-hand side of FIG. 7, and the fluidizing conveying units 60 are moved to a position beneath the discharge outlets 9 of the hoppers for the purpose of maintaining the discharge outlets closed until it is desired to unload those hoppers, and then to effect discharge of such material. Each of the fluidizing units consists of an upper trough portion 61 into which material from the hopper discharge outlets is received, a gas-permeable deck 62 and an underlying plenum chamber 63 into which air under pressure, from flexible branch lines 64, is introduced to fluidize overlying material. The gas-permeable deck 62 is inclined in an athwartwise direction (FIG. 5). When air is introduced into the plenum chamber 63 to fluidize the material, the fluidized material flows downwardly along the deck 62 and flows from the discharge end of the deck into a hood 66 which, when the fluidizing conveying unit is in the position shown in FIG. 5, tightly fits against the upper end of a chute 67 which transfers the pulverulent material into a screw conveyor 22 extending fore and aft of the ship at one side of the hopper athwartwise of the ship. The lower end of the hood 66 is outwardly flanged to provide a recessed portion in which a sealing gasket 69 is seated. When the hood 66 is in the position shown in FIG. 5, the gasket 69 makes a dust-tight seal with the upper edges of the chute 67.

The fluidizing conveying units 60 are supported from fore and aft extending closed pipes 70 and 71. The end of the fluidizing unit adjacent to the pipe 70 is supported therefrom by means of one or more brackets 72 extending from the pipe 70 and adjustable linkage 73 connected at its lower end to a bracket 74 extending from the unit. The end of the fluidizing unit 60 adjacent to the pipe 71 is provided with brackets 75 having upstanding portions which are welded or otherwise secured to the pipe 71.

Figure 8:
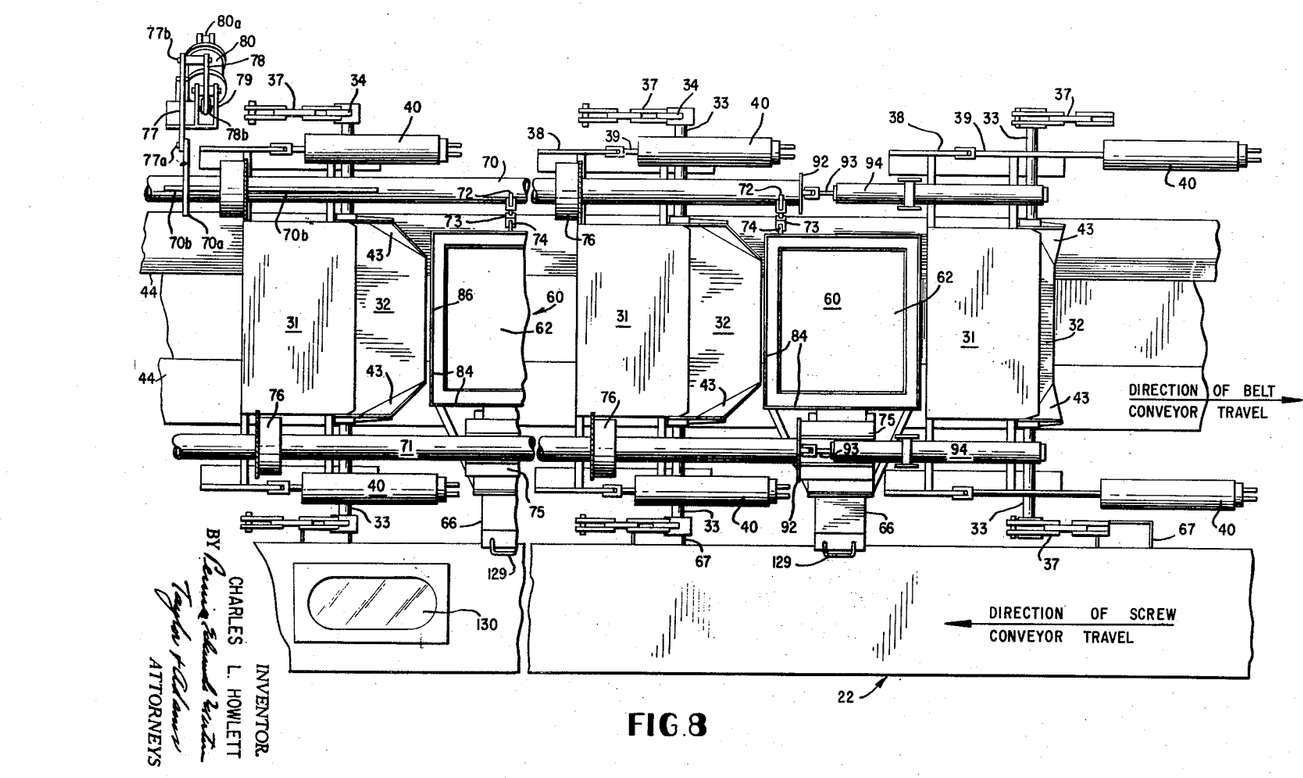
FIG. 8 is a plan view showing the control means for operating the closure gates and the fluid-activated gravity conveyors to bring them under, or to remove them from below the discharge outlets of the hoppers.

Since it is necessary that the fluidizing units be movable to positions where they do not lie beneath the discharge opening of the hoppers, in order to enable the gate units 29 to be positioned beneath those openings, the pipes 70 and 71 are mounted in bearings 76 (FIG. 8) for movement fore and aft of the ship.

Figures 9, 10:
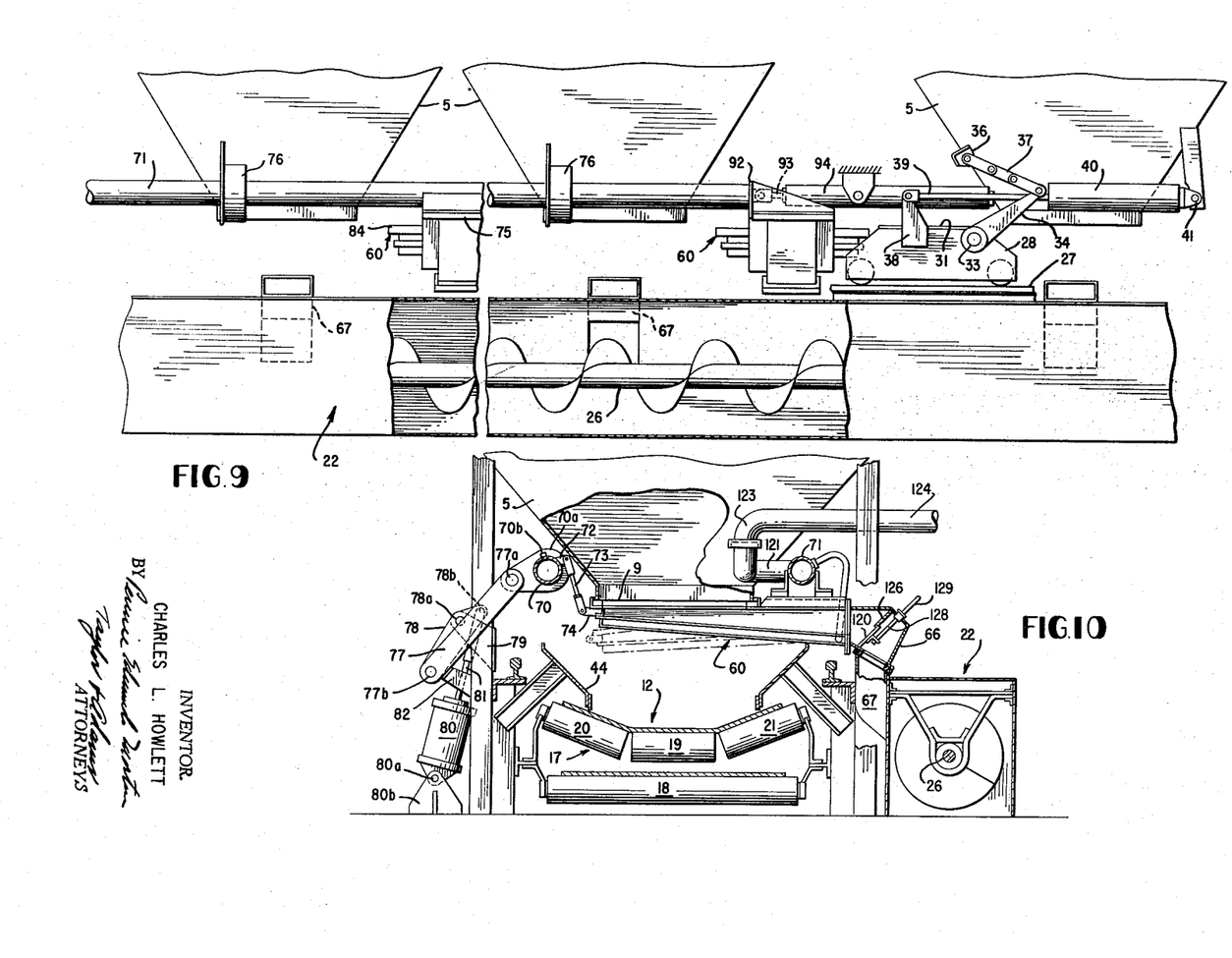
FIG. 9 is a side elevational view of the mechanism shown in FIG. 8.
FIG. 10 is an enlarged view showing the means for raising and lowering the fluidizing conveying units.

The means for raising and lowering the fluidizing conveying units 60 to engage or disengage with the discharge outlets 9 of the holds or bunkers is shown on an enlarged scale in FIG. 10. Referring to that figure, the pipe 70 is provided with a crank arm 70a which is keyed by a key 70b to the pipe 70 so that it is non-rotatably secured thereto, while at the same time the pipe 70 and the key 70b may move longitudinally with respect to the crank arm. The outer end of the crank arm has a link 77 pivotally connected thereto at 77a, which in turn is pivotally connected at 77b to one end of a lever arm 78 pivoted at 78a midway of its length to a bracket 79 attached to a fixed portion of the ship. An air cylinder 80 has one end thereof pivotally connected at 80a to a bracket 80b attached to a fixed part of the ship. The air cylinder is provided with the usual piston and suitable connections for supplying air to either side of the piston to move it in one direction or the other, longitudinally of the cylinder, as hereinafter described. The piston of the cylinder has a piston rod 81 extending through one end of the cylinder, with the outer end of the piston rod pivotally connected at 78b to the other end of the lever arm 78. A bracket 82, fixed to a stationary part of the vessel forms a stop for engagement by the link 77 when the piston rod 81 has moved outwardly of the cylinder 80 a distance sufficient to raise the fluidizing conveying unit 60 into tight engagement with the discharge outlet 9 of one of the holds or bunkers.

The fluidizing units 60 are provided with upwardly-extending flanges 84 which provide a shoulder for sealing gasket 86 (FIG. 5) for making a dust-tight seal with the boundary edges of the discharge outlets 9 of the hoppers. When a fluidizing unit 60 is positioned beneath a hopper, and when it is desired to raise it so that its sealing gasket 86 will make a dust-tight seal with the boundary edge of the hopper, it is necessary that the pipe 70 be rotated in a counterclockwise direction, as viewed in FIG. 5 and FIG. 10. In like manner, if it is desired to lower a fluidizing unit from engagement with the discharge outlet of a hopper, the pipe 70 should be rotated in a clockwise direction. Since the fluidizing unit is securely fastened to pipe 71, this pipe will act as a pivot and will rotate slightly in a direction opposite to pipe 70. With this arrangement, when the air cylinder 80 is operated in a direction to rotate the pipe 70 counterclockwise, as viewed in FIGS. 5 and 10, such counterclockwise motion will raise the fluidizing unit to bring it into tight engagement with the hopper discharge outlet 9 and also will lower the discharge hood 66 of the fluidizing unit into tight engagement with the top of the screw conveyor chute 67.

Since the right-hand side of the fluidizing unit 60, as viewed in FIGS. 5 and 10, will swing about the axis of the pipe 71, and since the left-hand side of the fluidizing unit is connected to the pipe 70 through the linkage 73, the fluidizing unit will not move towards and from the discharge outlet of the hopper in a truly vertical direction, but will be swung in an arc about the axis of the pipe 71.

In FIGS. 5 and 10, the fluidizing conveying unit 60 is shown in its raised position for making a tight connection with the discharge outlet 9 of the hold or bunker 2 and for causing the hood 66 to make a tight connection with the top of chute 67. In this position, the piston rod 81 has been moved to its extreme outer position and the lever arm 78 has been swung to the position to cause the link to bear against the stop bracket 82, with the pivot points 77a and 77b both at the same side of the pivot 78a of the lever arm. In this position, the fluidizing conveying unit 60 is locked against movement caused by a heavy downward load of material on the gas-permeable deck 62.

When it is desired to lower the fluidized conveying unit so that it may be moved from beneath the discharge outlet to permit the gate member 31 to be brought beneath the discharge outlet to close it, air is introduced into the opposite end of the cylinder 80 to move the piston thereof in a direction to move the piston rod 81 inwardly of the cylinder. This causes the lever arm 78 to swing about the pivot 78ᵃ in a clockwise direction, and through the link 77 and crank arm 70ᵃ causes the pipe 70 and attached bracket 72 to turn in a clockwise direction. This causes the fluidizing conveyor unit to swing about the pipe 71 as a fulcrum, lowering the unit proper from engagement with the discharge outlet 9, and at the same time raising the hood 66 from engagement with the upper end of the chute 67, as shown in dotted lines. The fluidizing conveying unit, when in this position, is free to be moved from beneath the discharge outlet 9 of the hold or bunker by longitudinal movement of the pipes 70 and 71.

When the fluidizing units are moved from beneath the discharge outlets of the hoppers, as shown in FIG. 7, they pass to a position where they underlie fixed covers 91 with which they make a reasonably tight seal. The covers 91 prevent extraneous material from falling into the trough portion 61 of the fluidizing units which might, when the fluidizing units again are moved to a position beneath the hopper outlets for discharge of pulverulent material, contaminate such material. The covers 91 also prevent wetting of the gas-permeable decks of the fluidizing units during work-down operations, which otherwise would result in caking of cement in the interstices of the gas-permeable deck and the blocking of the passage of air therethrough.

A plurality of fluidizing units are secured to pipe 71 and supported from pipe 70 to form a group.

To provide for the fore and aft movement of the pipes 70 and 71, one end of each fluidizing unit is provided with an upwardly-extending bracket 92 to which the piston rod 93 of an air cylinder 94 is connected. Introduction of air under pressure into the respective ends of the cylinders 94 will move the pistons therein in one of the other directions for the purpose of extending or retracting the piston rods 93, and concomitantly moving the fluidizing unit groups to positions in which they either underlie the discharge outlets 9 of the hopper or are completely removed from beneath those outlets to a position beneath the covers 91.

Figure 11:
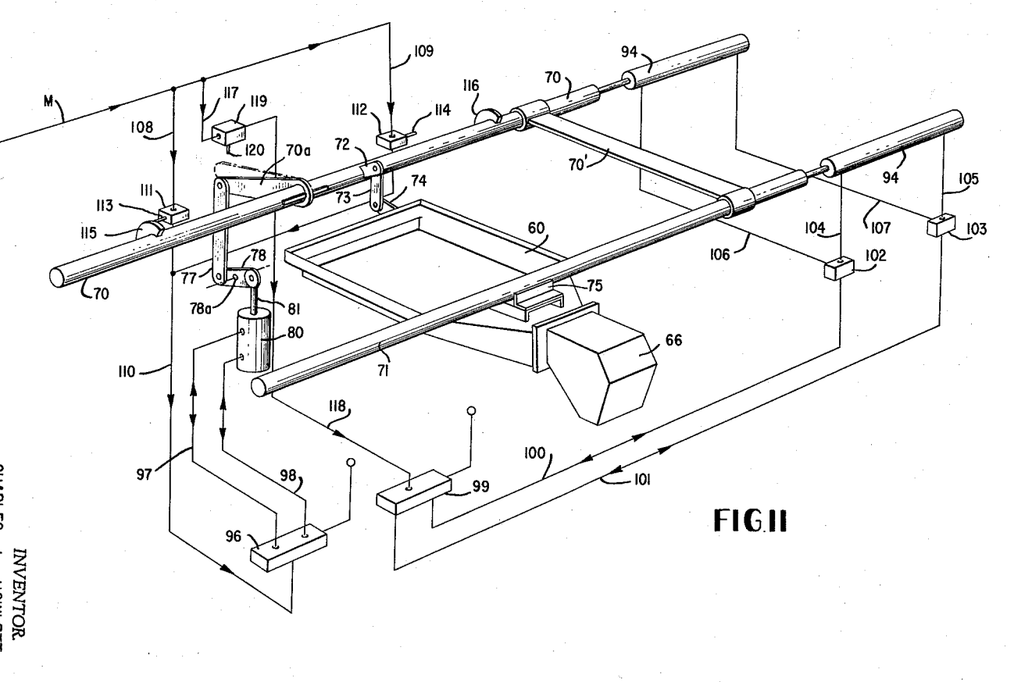
FIG. 11 is a view showing, schematically, the actuation of the control valves for the control means shown in FIGS. 8 and 9.
Figure 12:
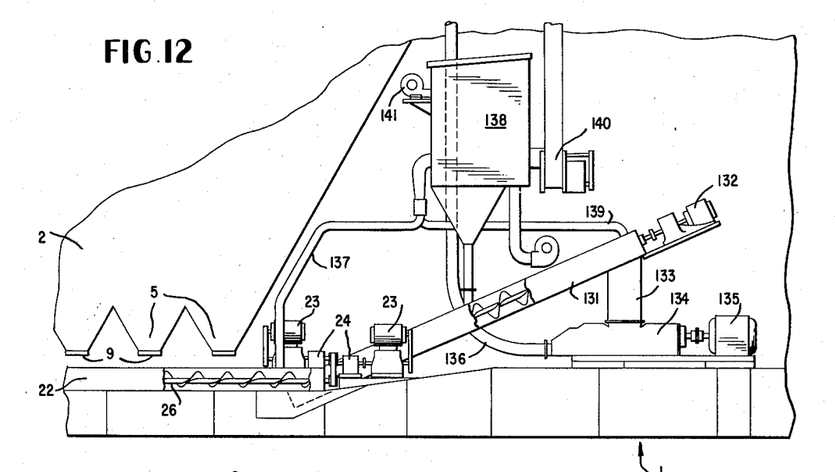
FIG. 12 is a vertical sectional view of a portion of the ship near the cement unloading end thereof.

In lieu of having separate air cylinders 94 for each of the pipes 70 and 71, the pipes may be connected by a cross-tie 70′, as shown in FIG. 11, and air cylinder 94 connected only to pipe 70, in which case movement of pipe 70 will also cause movement of pipe 71 through the cross-tie.

The actuating means for raising and lowering the fluidizing conveying unit and for moving the pipes 70 and 71 fore and aft of the ship are shown diagrammatically in FIG. 11, where the raising and lowering of the fluidizing conveying unit is controlled by the four-way hand valve 96 which controls the flow of air in both directions through conduits 97 and 98 leading to the air cylinder at opposite ends thereof.

The movement of the pipes 70 and 71 fore and aft of the ship is controlled by the four-way hand valve 99 which controls the flow of air in both directions through conduits 100 and 101 leading to flow control valves 102 and 103 and from the flow control valves through branch conduits 104 and 105 leading to air cylinder 94 and branch conduits 106 and 107 leading to the other air cylinder 94. The flow control valves 102 and 103 control the speed of movement of pipes 70 and 71, and, consequently, the speed of shifting of the fluidizing conveying units 60.

Air is supplied to the four-way valve 96 from a main supply line M, maintained under a pressure of 100 p.s.i., through branch conduits 108 and 109, both connected to a supply line 110 leading directly to the valve 96. Lock-out valves 111 and 112 are located in branch lines 108 and 109, respectively. These lock-out valves prevent the flow of air to the valve 96 except when the fluidizing conveying unit 60 is either at one or the other extreme end of its fore and aft movement. These lock-out valves are actuated to permit flow of air through branch lines 108 and 109 by valve stems 113 and 114, respectively, which are engaged by and moved to valve-open position by outwardly-extending quadrants 115 and 116, respectively, when the pipe 70 approaches one or the other of its extreme end positions. Thus, when the pipe 70 has moved to bring the fluidizing conveying unit 60 to its extreme left position, as shown in FIG. 11, the quadrant 115 engages and moves the valve stem 113 inwardly to open the lock-out valve 111 and permit flow of air through branch line 108 and supply line 110 to the four-way valve 96. When the pipe 70 moves in the opposite direction to bring the fluidizing conveying unit to its extreme right position, the quadrant 116 will engage and move valve stem 114 inwardly to open lock-out valve 112 to permit flow of air through branch line 109 and supply line 110 to the four-way valve 96.

Air is supplied to the four-way valve 99 through branch line 117 and supply line 118. A lock-out valve 119, similar to lock-out valves 111 and 112, is positioned in branch line 117 and cuts off supply of air to the four-way valve 99 until the crank arm 70ᵃ has been raised to its maximum extent and engages valve stem 120 and moves it inwardly to open valve 119.

Thus, the fluidizing conveying unit 60 can be raised or lowered only when the pipe 70 is in one or the other of its extreme end positions and the air cylinders 94 can be actuated to move the pipes 70 and 71 longitudinally only when the fluidizing conveying unit 60 has been moved to a position where it disengages from the discharge outlet 9 and the hood 66 thereof is disengaged from the upper end of the chute 67.

The pipe 71 is closed at each end and also functions as an air manifold for supplying air to the branch pipes 64. For this purpose, a branch conduit 121, FIG. 5, extends laterally from the pipe 71 and has its distal end bent upwardly at right angles to terminate at an intake 122. The branch conduit 121 moves longitudinally and swings up and down as the pipe 71 moves longitudinally and rotates, respectively. When a fluidizing unit has been brought to the position shown in FIG. 5, beneath the discharge outlet of a hopper and has been swung upwardly to engage the hopper, the inlet 122 of the branch conduit 121 will likewise be swung upwardly and will engage the discharge end 123 of a fixed pipe 124 which supplies air to the pipe 71 and through it and branch pipes 64 to the plenum chambers 63 of the fluidizing units 60. The discharge end 123 of the pipe 124 carries a suitable gasket which will be engaged by the inlet 122 of branch conduit 121 when the latter is swung upwardly to form an air-tight engagement. When the parts are in the position shown in FIG. 5, and it is desired to discharge pulverulent material from the hopper, it is only necessary to admit air to the pipe 124 to pass to the plenum chamber of the fluidizing unit.

In order that the person unloading the ship may have control over the unloading of individual hoppers of the holds or bunkers, the pipes 70 and 71 do not extend the full length of the ship, but rather are made in sections to form groups, each serving a group of fluidizing units for unloading a limited number of hoppers. The longitudinal movement of each section is controlled by separate air cylinders 94 and the rotation of the pipes of each section is controlled by their own air cylinder 80. In like manner, the trucks 28 carrying the gate units 29 have their own actuating air cylinders 40. The operation of the respective pipe sections and the respective trucks may be remotely controlled from a suitably located control panel. Such individual control of the means for unloading the respective hoppers is important, since in the unloading of the ship, the holds or bunkers must be so unloaded as not to disturb the balance of the ship. Also, the bunkers must be selectively unloaded in accordance with the type or quality of cement that each bunker contains.

To prevent discharge of pulverulent material until such time at it is desired to unload the holds or bunkers, the hoods 66 of the fluidizing units are provided with baffles 126, the lower ends of which are spaced from the floors of the hoods to provide spaces for the flow of materialf rom the gas-permeable decks 62 to the chutes 67. These spaces may be completely closed or opened to the desired extent by sliding valves 120 having feed rods 128 and handles 129 for manual operation.

Each of the screw conveyors is provided with a sight glass 130 (FIG. 8) so that the person in charge of the unloading can see if the screws are running full. If not, he can open the valve 120 farther until it is.

Fluidized material from each screw conveyor 22 at each side of the center line of the ship is discharged into an inclined conveyor 131 extending forwardly and upwardly and driven from a motor 132 through suitable speed reduction gearing. At the upper end of the screw conveyor 131 the material discharges into a downcomer 133 and is introduced thereby into the inlet of a fluidizing pump 134 driven by a motor 135. The pump 134 may be of the well-known Fuller-Kenyon type. The material discharged into the fluidizing pump 134 is fluidized therein and is discharged through the conduit 136 to storage facilities located at the dock or nearby.

Any dust in the screw conveyor 22 is withdrawn from adjacent its discharge end and passes through a pipe 137 to a dust collector or bag house 138. In like manner, any dust in the inclined conveyor 131 is withdrawn from its upper end through a pipe 139 and is passed into the dust collector or bag house 138. A blower 140 is provided for applying the necessary suction to the duct collector or bag house to cause any dust in the screw conveyors 22 and 131 to be drawn into the dust collector. A second blower 141 is provided for reverse cleaning of the bags of the dust collector in a well-known manner.

From the foregoing, it will be apparent that the present invention provides for the maximum utilization of ships or other vehicles which are used for the transportation and discharge of materials having widely different characteristics and which require different types of mechanisms for their unloading. Also, with a vessel as described herein separate cargoes which could contaminate each other on alternate trips are kept independent of each other throughout the part of the unloading system which is difficult to clean. In other words, the only part of the vessel which is common to the two cargoes is the cargo hold, which is relatively easily cleaned. Further, the vessel of the present invention has the advantage that the separation of the unloading means out of the common hold permits of clean-up of either unloading means and thereby increases the efficiency of the complete cargo handling cycle.

Various changes may be made in the details of construction of the vehicle herein described without departing from the scope of the invention or sacrificing any of the advantages thereof. Thus, for purposes of illustration, the arrangement is such that the conveyor for the cement carries it forward for discharge from the vessel and conveyor for the coal carries it aft for discharge. However, this arrangement could be reversed, with the coal being carried aft for discharge and the cement being carried forward; or the conveyor could be so operated that both the cement and the coal would be carried to either end of the vessel for discharge. Also, while reference has been made herein to the use of air cylinders, it is to be understood that hydraulic oil cylinders, elastic actuators, or the like could be used.

I claim:

1. In an apparatus for storage and discharge of bulk as well as pulverulent material comprising a receptacle for material having a discharge outlet in the bottom thereof, a supporting means positioned adjacent said discharge outlet, a gate member mounted on said supporting means for selective reciprocal movement between a position beneath the discharge outlet to close the outlet and a position to one side of the outlet to permit discharge of material therethrough, said gate member adapted to discharge material from said outlet, a fluid-activated gravity-conveying unit, at least one supporting member positioned immediately adjacent said discharge outlet, means mounting said fluid-activated gravity-conveying unit from said supporting member for selective reciprocal movement to a position beneath said discharge outlet to receive material therefrom and to convey received material from therebeneath to a position to one side of said discharge outlet to permit said gate member to be moved to a position beneath said discharge outlet and means for moving said gate member and said fluid-activated gravity-conveying unit.

2. Apparatus as defined in claim 1, including conveying means positioned beneath said discharge outlet to receive material discharged therethrough when both said gate member and said fluid-activated gravity-conveying unit are moved to one side of said discharge outlet.

3. Apparatus as defined in claim 1, including conveying means positioned to one side of said discharge outlet to receive material discharged into and conveyed by said fluid-activated gravity-conveying unit.

4. Apparatus as defined in claim 3, in which said conveying means is a screw conveyor.

5. Apparatus as defined in claim 4, including a chute for directing material into said screw conveyor and having an upwardly-extending portion with an opening to receive material from said fluid-activated gravity-conveying unit, and the discharge side of said fluid-activated gravity-conveying unit has a hood adapted to fit over the opening of said chute.

6. Apparatus as defined in claim 2, including conveying means positioned to one side of said discharge outlet to receive material discharged into and conveyed by said fluid-activated gravity-conveying unit.

7. Apparatus as defined in claim 6, in which the conveying means positioned beneath said discharge outlet is a belt conveyor and the conveying means positioned to one side of said discharge outlet is a screw conveyor.

8. Apparatus as defined in claim 1, in which said gate member is mounted on rails and which includes means for moving said gate member along said rails.

9. Apparatus for storing and discharging pulverulent material comprising a receptacle having a discharge outlet, a conveyor for material discharged from said outlet, a fluid-activated gravity-conveying unit, a pair of elongated members, one mounted on each of opposite sides of said outlet, said members supporting said fluid-activated gravity-conveying unit, bearings are included for mounting said elongated members for reciprocation therethrough, means for selectively moving said fluid-activated gravity-conveying unit to positions beneath said outlet to receive material therefrom and to move said unit to one side thereof, for moving said elongated members reciprocally through said bearings, the selective moving means includes at least one fluid ram, and means, when said fluid-activated gravity-conveying unit is positioned beneath said discharge outlet, to convey material from said fluid-activated gravity-conveying unit to said conveyor.

10. Apparatus as defined in claim 9, including a chute for directing material into said conveying line and having an upwardly-extending portion with an opening to receive material from said fluid-activated gravity-conveying unit, and said fluid-activated gravity-conveying unit has a hood adapted to fit over the opening of said chute.

11. Apparatus as defined in claim 10, including means to make a dust-tight seal between said fluid-activated gravity-conveying unit and said discharge outlet, and means to make a dust-tight seal between said hood and said chute.

12. Apparatus as defined in claim 9, including means forming a cover for said fluid-activated gravity-conveying unit when it is moved to one side of said discharge outlet.

13. Apparatus for storing and discharging pulverulent material comprising a receptacle having a discharge outlet, a conveying line for material discharged from said outlet, a fluid-activated gravity-conveying unit, a pair of members, one mounted at each of opposite sides of said outlet, means supporting said fluid-activated gravity-conveying unit from said members, bearings supporting said members for rotation therein, means mounting one side of said fluid-activated gravity-conveying unit for oscillatory movement about the axis of the supporting member therefor at one side of the discharge outlet, a bracket extending from the supporting means for the fluid-activated gravity-conveying unit at the other side of said discharge outlet, and means connecting the opposite side of said fluid-activated gravity-conveying unit to said bracket, whereby oscillation of said supporting member at said opposite side of the discharge outlet will cause movement of the said fluid-activated gravity-conveying unit away from and into engagement about said discharge outlet, means for oscillating said supporting member having the bracket attached thereto, means for selectively moving said fluid-activated gravity-conveying unit to positions beneath said outlet to receive material therefrom and for moving said unit to one side thereof, and means, when said fluid-activated gravity-conveying unit is positioned beneath said discharge outlet, to convey material from said fluid-activated gravity-conveying unit to said conveying line.

14. Apparatus as defined in claim 13, in which the means for oscillating said supporting member having the bracket attached thereto includes a crank arm extending therefrom, a fluid-activated ram and linkage connecting the piston rod of said ram to said crank arm.

15. Apparatus as defined in claim 14, in which, when the piston rod of said ram is moved to its extreme position in one direction, the fluid-activated gravity-conveying unit is raised to its upper position to engage about said discharge outlet, and when the piston rod has moved to such position the links of said linkage are brought to a position to lock them, except by reverse movement of said piston rod, in position to maintain the fluid-activated gravity-conveying unit about said discharge outlet.

16. Apparatus as defined in claim 13, including a chute for directing material into said conveying line and having an upwarddly-extending portion with an opening to receive material from said fluid-activated gravity-conveying unit, a hood carried by said fluid-activated gravity-conveying unit and adapted, when said fluid-activated gravity-conveying unit is engaged about said discharge outlet, to fit over the opening of said chute.

17. Apparatus as defined in claim 16, in which the opening in said chute is at a lower level than the supporting member about which said fluid-activated gravity-conveying unit oscillates, the hood is carried at one end of said fluid-activated gravity-conveying unit, and the fluid-activated gravity-conveying unit is mounted intermediate its length for oscillatory movement about said supporting member, whereby oscillation of said fluid-activated gravity-conveying unit in a direction to cause it to move in engagement about said discharge outlet lowers said hood towards said opening in said chute.

18. Apparatus as defined in claim 14, in which the means for moving the members supporting the fluid-activated gravity-conveying unit to selective positions beneath said discharge outlet and to one side thereof includes a fluid-activated ram, and which includes a fluid system for supplying fluid to said ram and to the ram which causes oscillation of said fluid-activated gravity-conveying unit, said fluid system including flow control valves for controlling the flow of fluid to the fluid ram which moves the supporting members for said fluid-activated gravity-conveying unit and thereby control the speed of movement of said members.

19. Apparatus as defined in claim 14, in which the means for moving the members supporting the fluid-activated gravity-conveying unit to selective positions beneath said discharge outlet and to one side thereof includes a fluid-activated ram, and which includes a fluid system for supplyinging fluid to said ram and to the ram which causes oscillation of said fluid-activated gravity-conveying unit.

20. Apparatus as defined in claim 19, in which said fluid system includes means for preventing the supply of fluid to the ram for causing oscillation of said fluid-activated gravity-conveying unit until said fluid-activated gravity-conveying unit is at one or the other of its extreme positions when selectively moved to bring it to positions beneath said discharge outlet and to one side thereof.

21. Apparatus as defined in claim 20, in which said means for preventing supply of fluid to the ram for causing oscillation of said fluid-activated gravity-conveying unit are lock-out valves in said fluid system, and said supporting means for selectively moving said fluid-activated gravity-conveying unit to positions beneath said discharge outlet and to one side thereof includes means for engaging and opening said lock-out valves when said supporting means have been moved to either of its extreme positions.

22. Apparatus as defined in claim 21, in which said fluid system includes a main supply line, branch lines extending from said main supply lines, each of said branch lines is connected to the ram for causing oscillation of said fluid-activated gravity-conveying unit, and one of said lock-out valves is located in each of said branch lines.

23. Apparatus for storing and discharging pulverulent materal comprising a receptacle having a discharge outlet, a conveying line for material discharged from said outlet, a fluid activated gravity-conveying unit, a pair of members, one mounted at each of opposite sides of said outlet, means supporting said fluid-activated gravity-conveying unit from said members, bearings supporting said members for rotation therein, means mounting one side of said fluid-activated gravity-conveying unit for oscillatory movement about the axis of the supporting member therefor at one side of the discharge outlet, means for oscillating said supporting member, means for selectively moving said fluid-activated gravity-conveying unit to positions beneath said outlet to receive material therefrom and for moving said unit to one side thereof, and means, when said fluid-activated gravity-conveying unit is positioned beneath said discharge outlet, to convey material from said fluid-activated gravity-conveying unit to said conveying line.

24. Apparatus as defined in claim 1, including another supporting member also supporting said fluid-activated gravity-conveying unit, each supporting member mounted at each of opposite sides of said discharge outlet.

References Cited by the Examiner

UNITED STATES PATENTS

| 2,557,016 | 6/51 | Smith | 214—15 |
| 2,813,640 | 11/57 | Loomis | 214—17 |
| 3,069,207 | 12/62 | Borger et al. | 302—52 |

FOREIGN PATENTS 757,191 9/56 Great Britain.

HUGO O. SCHULZ, *Primary Examiner.*